(12) United States Patent
Macklin

(10) Patent No.: US 7,027,973 B2
(45) Date of Patent: Apr. 11, 2006

(54) SYSTEM AND METHOD FOR CONVERTING A STANDARD GENERALIZED MARKUP LANGUAGE IN MULTIPLE LANGUAGES

(75) Inventor: Lee Macklin, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 991 days.

(21) Appl. No.: 09/905,759

(22) Filed: Jul. 13, 2001

(65) Prior Publication Data

US 2003/0014237 A1   Jan. 16, 2003

(51) Int. Cl.
*G06F 17/22* (2006.01)

(52) U.S. Cl. .............................................. 704/2; 704/8

(58) Field of Classification Search .................... 704/2, 704/3, 5; 717/136, 139
See application file for complete search history.

(56) References Cited

U.S. PATENT DOCUMENTS

| | | | |
|---|---|---|---|
| 6,502,102 B1 * | 12/2002 | Haswell et al. | 707/102 |
| 6,560,616 B1 * | 5/2003 | Garber | 707/203 |
| 6,684,388 B1 * | 1/2004 | Gupta et al. | 717/136 |
| 6,859,820 B1 * | 2/2005 | Hauduc et al. | 709/203 |

* cited by examiner

*Primary Examiner*—Abul K. Azad

(57) ABSTRACT

A method for converting text characters from a Standard Generalized Markup Language file into another specified language using a CONVERSTR variable, a HTMLCODE variable and a VAL variable, wherein each character represents a tag or text, and each tag has a start and an end, which includes the steps of (a) reading a character from the file, (b) determining whether the read character is the start of a tag, (c) adding the read character to the CONVERTSTR variable when the read character is not the start of a tag, (d) repeating steps (a), (b) and (c) for a next character until a read character is the start of a tag, (e) converting the CONVERTSTR variable into the specified language, and (f) adding the converted CONVERTSTR variable to the HTMLCODE variable.

14 Claims, 6 Drawing Sheets

40

```
#Initialize the HtmlCode variable
HtmlCode = ""

#Read a character from the original HTML
Read Char

#Loop through all of HTML and convert the text characters
While not EOF do
  # Comment : Initialize the strings
  ConvertStr = " "
  VAL = ""

# Comment : Simply move html tags to html code variable
  If Char = "<"
    Read Char until Char = ">"
    HtmlCode = HtmlCode + Char
  End if

# Comment : All chars until tag starts are placed in variable
  Read Char
  While not Char = "<"
    ConvertStr = ConvertStr + Char
    Read Char
  loop If CONVERTSTR ! = " "
  # Comment : Convert parsed text characters
  VAL = Run function to translate ConvertStr into specified language

# Comment : Add parsed text to the html code
  HtmlCode = HtmlCode + VAL
End if
Loop
```

FIG. 2

```
<HTML>
    <HEAD>
    <TITLE>
    THIS IS TEST HTML
    </TITLE>
    </HEAD>
    <BODY>
    Hello World!
    </BODY>
</HTML>
```

FIG. 5

SYSTEM AND METHOD FOR CONVERTING A STANDARD GENERALIZED MARKUP LANGUAGE IN MULTIPLE LANGUAGES

The present invention generally relates to an improved method and system for converting text from a Standard Generalized Markup Language ("SGML") file having a plurality of characters to another specified language. More specifically, it relates to an improved method and system for converting text from a Standard Generalized Markup Language file having a plurality of characters into another specified language using a CONVERSTR variable, a HTMLCODE variable and a VAL variable, wherein each character represents a tag or text, and each tag has a start and an end.

As a result of the Internet, global communication has become commonplace for most business interactions. It is currently quite typical that a file is required to be available in multiple languages. This is especially useful for World Wide Web communications because the Internet is used in different countries. Thus, there is a clear need for files and web pages to be available in multiple languages. Put differently, files and web pages need to be adapted for use with an international market.

Currently, most web pages that are available in different languages are done on a page-level basis, meaning each and every page is stored in different language versions. For example, in the context of the web, if a Hyper Text Markup Language ("HTML") page is available in five languages, the HTML page in each language constitutes a separate file. So, because five different languages are available, there will be five files for the same HTML page. In other words, there is one file for each available language.

One problem with this prior method is that it is necessary to code the pages for each language. Another problem is that because the same page must be kept in multiple files for different languages, the prior method inefficiently uses memory. This will become more acute as the use of Personal Digital Assistants ("PDAs") becomes more popular, since these portable computers tend to have less storage memory. In addition, the use of multiple files makes revisions to these files and pages very time consuming and error prone, since each file must be separately revised. Thus, there is a need for an improved method that can translate the web pages into different languages.

BRIEF SUMMARY OF THE INVENTION

The present invention is directed to an improved method and system for providing a file in multiple languages. More specifically, it relates to an improved method and system for converting text characters from a Standard Generalized Markup Language file into another specified language using a CONVERSTR variable, a HTMLCODE variable and a VAL variable, wherein each character represents a tag or text, and each tag has a start and an end.

The present invention provides a method that includes the steps of (a) reading a character from the file, (b) determining whether the read character is the start of a tag, (c) adding the read character to the CONVERTSTR variable when the read character is not the start of a tag, (d) repeating steps (a), (b) and (c) for a next character until a read character is the start of a tag, (e) converting the CONVERTSTR variable into the specified language, and (f) adding the converted CONVERTSTR variable to the HTMLCODE variable.

The present invention also provides a system that includes a HTMLCODE variable for defining the strings in the Standard Generalized Markup Language coding, a CONVERTSTR variable for defining the strings that are to be converted into the specified language, a VAL variable for defining the strings that have been converted into the specified language, and a translator for translating the strings in the CONVERTSTR variable into the specified language.

DESCRIPTION OF THE DRAWINGS

FIG. 2 is a flow chart illustrating the overall preferred functionality of the method of the present invention;

FIG. 5 is an exemplary web content in a Hypertext Markup Language file that can be used with the present invention; and, FIG. 6 illustrates the Hypertext Markup Language file shown in FIG. 5 that is displayed in two different languages.

GLOSSARY OF TERMS AND ACRONYMS

Figure 1:
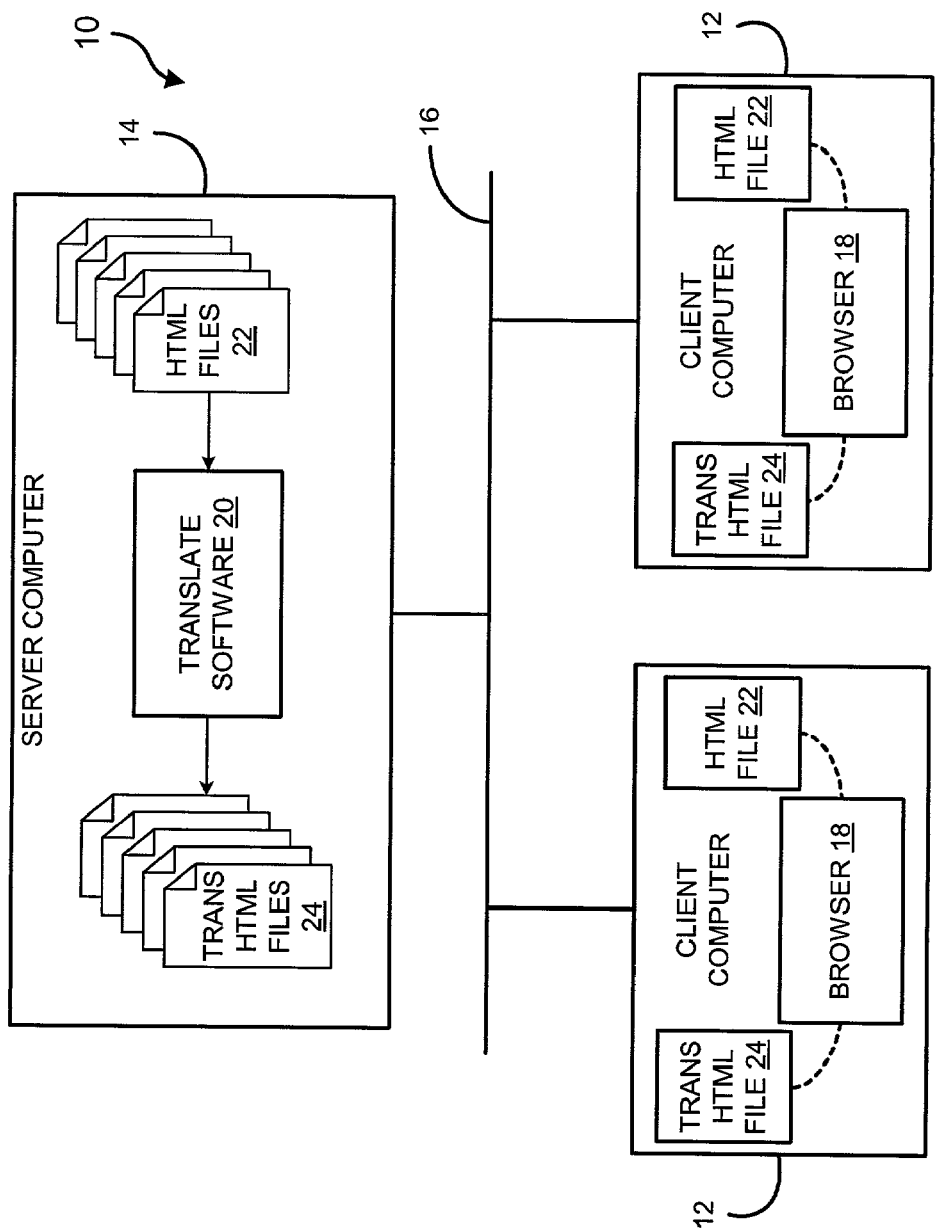
FIG. 1 is a block diagram of a network system in which the present invention can be implemented.

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on the computer of a user; the program which responds to browser requests by serving Web pages, or other types of Web content, is commonly referred to as a "Web server."

Content. A set of executable instructions that is served by a server to a client and that is intended to be executed by the client so as to provide the client with certain functionality. Web content refers to content that is meant to be executed by operation of a Web browser. Web content, therefore, may non-exhaustively include one or more of the following: HTML code, SGML code, XML code, XSL code, CSS code, Java applet, JavaScript and C-"Sharp" code.

CONVERTSTR variable. A variable of the present invention that defines the strings that are to be converted into a specified language.

HTMLCODE variable. A variable of the present invention that defines the strings in the Standard Generalized Markup Language coding.

Hyper Text Markup Language ("HTML"). A standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally, in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

Hyper Text Transport Protocol ("HTTP"). The standard World Wide Web client-server protocol used for the exchange of information (such as HTML documents, and client requests for such documents) between a browser and a Web server. HTTP includes a number of different types of requests, which can be sent from the client to the server to request different types of server actions. For example, a "GET" request, which has the format GET <URL>, causes the server to return the document or file located at the specified URL.

Hyperlink. A navigational link from one document to another, from one portion (or component) of a document to another, or to a Web resource, such as a Java applet. Typically, a hyperlink is displayed as a highlighted word or phrase that can be selected by clicking on it using a mouse to jump to the associated document or document portion or to retrieve a particular resource.

Hypertext System. A computer-based informational system in which documents (and possibly other types of data entities) are linked together via hyperlinks to form a user-navigable "web."

Internet. A collection of interconnected or disconnected networks (public and/or private) that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

Parser. An algorithm or program to determine the syntactic structure of a sentence or string of symbols in some language. A parser normally takes as input a sequence of tokens output by a lexical analyzer. It may produce some kind of abstract syntax tree as output.

Personal Digital Assistant (PDA). A small hand-held computer used to write notes, track appointments, manage email and browse the web, etc., generally with far less storage capacity than a desktop computer.

Plug-In. A file containing data used to alter, enhance, or extend the operation of a parent application program. For example, a browser plug-in is a file that is configured to alter, enhance or extend the operations of a web browser.

String. A string is a sequence of data values, usually bytes, which usually stand for characters (a "character string"). The mapping between values and characters is determined by the character set which is itself specified implicitly or explicitly by the environment in which the string is being interpreted.

Tag. An SGML, HTML, or XML token representing the beginning (start tag: "<p . . . >") or end (end tag: "</p>") of an element. In normal SGML syntax (and always in XML), a tag starts with a "<" and ends with an ">". In HTML jargon, the term "tag" is often used for an "element".

Text Characters. Text characters represent the actual text that are to be displayed to the users within a SGML file. In contrast, the tags in the SGML file generally defines the formats of the text characters (e.g., <bold></bold>).

URL (Uniform Resource Locator). A unique address which fully specifies the location of a file or other resource on the Internet or a network. The general format of a URL is protocol: //machine address:port/path/filename.

VAL variable. A variable of the present invention that defines the strings that have been converted into the specified language.

Web Browser. A browser for browsing the World-Wide Web. Currently, the two main standard browsers are Microsoft Internet Explorer™ from Microsoft Corporation and Netscape Navigator™ from Netscape Communications Corporation.

Web Site. A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. More importantly, a Web Site can have additional functionality, for example, a Web site may have the ability to print documents, scan documents, etc.

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

DETAILED DESCRIPTION

Broadly stated, the present invention is directed to a method and system for converting text from a SGML file having a plurality of characters into another specified language, wherein each character represents a tag or text. Each tag has a start and an end. The method and system provides a way to translate a file in multiple languages using a CONVERSTR variable, a HTMLCODE variable and a VAL variable. As a result, multiple languages can be displayed with the use of a single file using the present invention.

The present invention first reads a character from the SGML file, and determines whether the read character is the start of a tag. The read character is added to the CONVERTSTR variable when it is determined that the read character is not the start of a tag, and the process is repeated for each successive character until a read character is the start of a tag. Upon finding a read character that is the start of a tag, the CONVERTSTR variable is converted into the specified language and added to the HTMLCODE variable.

The network system in which the present invention can be implemented is shown in FIG. 1, and indicated generally at 10. Two client computers 12 are connected to a server computer 14 configured for the present invention via a network 16. Although the Internet is the preferable network connection 16 because it provides a very flexible and universal system of communication, other networks, such as an intranet, are contemplated by the present invention as well.

For example, a web-based implementation, although preferred, is not the only option available. The present invention can be configured and coded to work with different network or operation systems. In fact, the present invention can be implemented without a network system at all. It can also be implemented with the use of a storage medium, such as a CD Rom, or installed software, such as a browser plug-in, on a standalone computer (not shown).

As a result of the many possible implementations for the present invention, an explanation of the current preferred embodiment of the network topology is given as an example. The complexity of the various available implementations is furthered by the use of different file formats that can change as a result, and the software or firmware needed to work with the given desired file formats.

In trying to present a clearer description of the present invention, a web-based implementation will be used as an example. However, it should be understood that others skilled in the art can appreciate the implementations of the various systems and configurations, and these implementations are within the scope of the present invention.

With a web-based implementation shown as an example, each client computer 12 includes a browser 18 for communicating. As shown, the server computer 14 also includes software 20 for translating HTML files 22 from any of the client computers 12 to translated HTML files 24, which is forwarded to the client computer that originated the translation request. It should be noted that although a HTML file is described as an example, any type of SGML files, such as XML, can be used with the present invention. Thus, it should be appreciated that other implementations with the use of other types of SGML files are contemplated, and are within the scope of the present invention.

The preferred code configuration is shown in FIG. 2, and indicated generally at 40. Because the present invention can be implemented in numerous ways, the preferred code configuration is broken down in various variables and loops. For example, the name give to the variables can be changed, and the loops can also be altered slightly. However, a person of ordinary skill in the art would appreciate that various methods can be implemented following the general break down of the code configurations. Consequently, other similar code configurations and methods are contemplated and are within the scope of the present invention.

In the preferred embodiment, there are three main variables, specifically the HTMLCODE, CONVERTSTR, and VAL variable. The HTMLCODE variable defines the strings in the Standard Generalized Markup Language coding. The remaining variable relates to the conversions. The CONVERTSTR variable defines the strings that are to be converted into the specified language, and the VAL variable defines the strings that have been converted into the specified language. Although not shown, the present invention includes a translator for translating the strings in the CONVERTSTR variable into the specified language. The translator can be any already commercially available translator that can be configured to work with the present invention. The translator contemplated can be any general translator that can translate phrases or sentences. In fact, most of these translator are available on the internet. The web site at http://www.web-a-dex.com/translate.htm provides a list of some of these translators that are freely available on the Internet. However, it should be noted that the present invention can be implemented with other available translators, and the various implementations with different translators are within the scope of the present invention.

The variables are initialized by being set to empty (e.g., HTMLCODE=" "; CONVERTSTR=" "; VAL=" "). Since characters must be read from the HTML file, the code configuration includes a command to read the character (i.e., READ CHAR;). Overall, there are four important loops. The first loop runs through all the characters of the file, and converts the text characters. While it is not the end of the file (i.e., EOF), the CONVERTSTR and VAL variables are initialized. Another loop will simply move the HTML tags to the HTMLCODE variable. There is another loop that reads all the characters for placement in the CONVERTSTR variable until a read character is the start of the tags. The last loop provides that, if the CONVERTSTR variable is not empty (i.e., if CONVERTSTR!=" "), run the VAL variable, which is defined as the function to translate the strings in the CONVERTSTR variable into the specified language. Then, the VAL variable is finally added to the HTMLCODE variable to convert the file back to HTML format after the translation is done.

Figure 3:
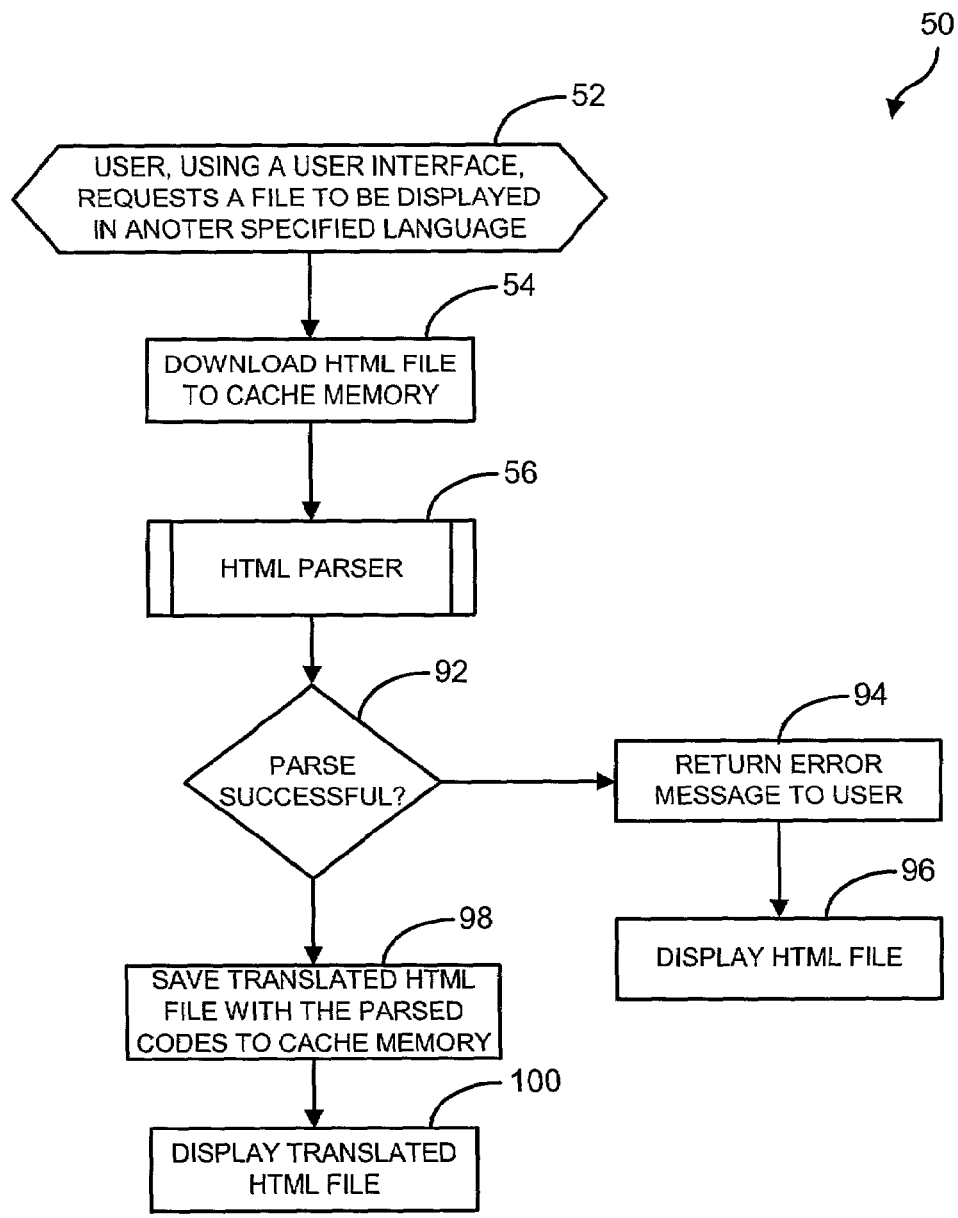
FIG. 3 is a flow chart illustrating the preferred functionality of the parsing method of the present invention shown in FIG. 2.

Turning to an important aspect of the present invention, a flow chart of the preferred functionality of a method is shown in FIG. 3, and indicated generally at 50. The method is initiated by a user, through a user interface, requesting a HTML file to be displayed in another specified language (block 52). The HTML file requested for the translation is first downloaded to the cache memory (block 54), and the HTML file is processed through a HTML parser, which will initiate a parsing method (block 56) shown in FIG. 4.

Figure 4:
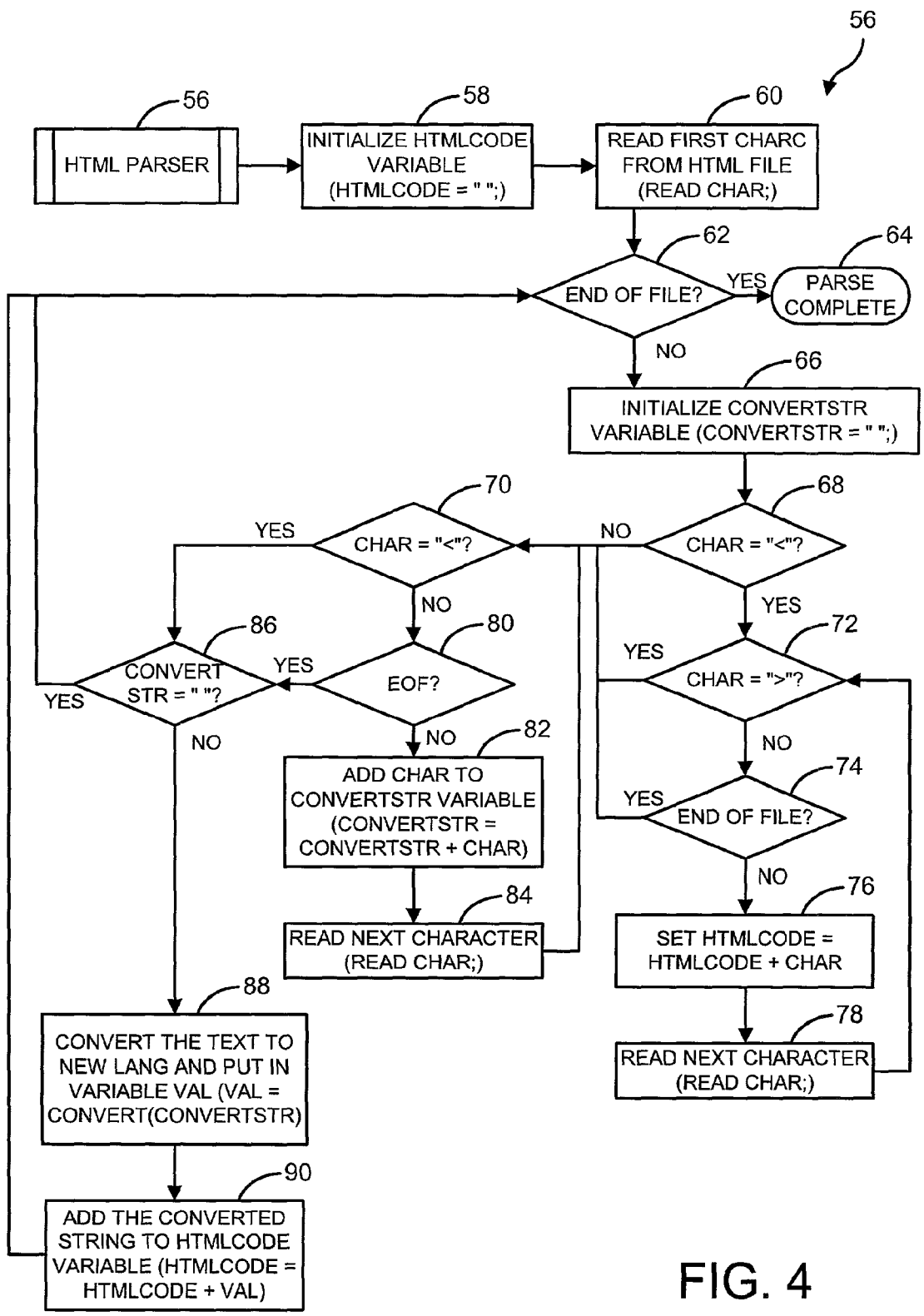
FIG. 4 illustrates the preferred code configuration of the preferred functionality of the parsing method.

Turning to FIG. 4, a flow chart of the preferred functionality of the parsing method is shown, and indicated generally at 56. A HTMLCODE variable is first initialized (block 58). In practice, the HTMLCODE variable is initialized by defining it to empty (i.e., HTMLCODE=" ";). Then, a first character is read from the HTML file (i.e., read char;) (block 62). It is next determined whether the read character (e.g., first character) is at the end of the file (block 62). Since it is the first character, it is unlikely that it is at the end of file. However, if the read character is at the end of file (block 62), the parsing method will end and continue back to FIG. 3. Otherwise, the CONVERTSTR variable will be initialized (block 66) if the read character is not at the end of the file (block 62). Similarly, to initialize the CONVERTSTR variable in the preferred embodiment, it is defined as empty (i.e., CONVERTSTR=" ").

From the read character, which is still the first character of the HTML file, it is determined whether the read character is the start of a tag (i.e., char="<") (block 68). If the read character is not the start of a tag (block 68), the method will loop to a second subroutine, wherein the first step is to determine whether the read character is the start of a tag (block 70). However, for the case of the first character, the process will continue to the next step of determining whether the read character (e.g., the first character) is an end of a tag, (i.e., char=">") (block 72) since the first character of the HTML file generally always begins with the start of a tag (i.e., "<"). If the read character is an end of a tag (block 72), the process will be forwarded to the next subroutine, specifically the step of determining whether the character is the start of a tag (block 70).

However, in the case of the first character, because it cannot be the end of a tag (block 72), it is next determined whether the read character is at the end of the file (block 74), which it likely will not be. However, if it is at the end of the file (block 74), the read character will be forwarded to the second subroutine starting with the step of determining whether the character is the start of a tag (block 70).

The read character, if it is not at the end of the file, is added to the HTMLCODE variable (i.e., HTMLCODE=HTMLCODE+char) (block 76), which is followed by the next character being read (block 78). This newly read next character is looped back to the step of determining whether the read character is the end of a tag (block 72). The subroutine is repeated until a character is either the end of a tag (i.e., char=">") (block 72) or at the end of the file (block 74). The read character then continues to the second subroutine, which determines whether it is the start of a tag (i.e., char="<") (block 70).

From the second subroutine, if the read character is not the start of a tag (block 70), it is next determined whether the read character is at the end of the file (block 80). If the read character is not at the end of the file (block 80), the read character is added to the CONVERTSTR variable (i.e., CONVERTSTR=CONVERTSTR+CHAR) (block 82), which is followed by a reading of the next character (i.e., READ CHAR;) (block 84). For the next read character, the method loops back to the starting step of the second subroutine, specifically determining whether the character is the start of a tag (block 70).

Each character is read and looped back until either a character is the start of a tag (block 70) or the character is at the end of the file (block 80). The method continues on to the next step of determining whether the CONVERTSTR variable is empty (i.e., CONVERTSTR=" "?) (block 86). If it is empty (block 86), the method loops back to the step of determining whether the read character is at the end of the file (block 62). Otherwise, the string in the CONVERTSTR is translated to the specified language, which is placed in a VAL variable (i.e., VAL=CONVERT(CONVERTSTR)) (block 88). The converted string is added to the HTML-CODE variable (i.e., HTMLCODE=HTMLCODE+VAL) (block 90). At this point, the earlier read character that was either the start of a tag (block 70) or at the end of the file (block 80), is looped back to the step of determining whether the read character is at the end of the file (block 62), and the process starts again.

After all the characters have been processed, or more specifically, after a read character is determined to be at the end of the file (block 62), the parsing method is then completed. The method continues back to FIG. 3, and it is then determined whether the parsing of the HTML file was successful (block 92). If it was not successful (block 92), an error message is returned to the user (block 94) and the HTML file without the translation will be displayed to the user (block 96). On the other hand, if the parsing was successful (block 92), the translated HTML file containing the parsed codes will be saved to the cache memory (block 98) and displayed to the user (block 100).

Figure 6:
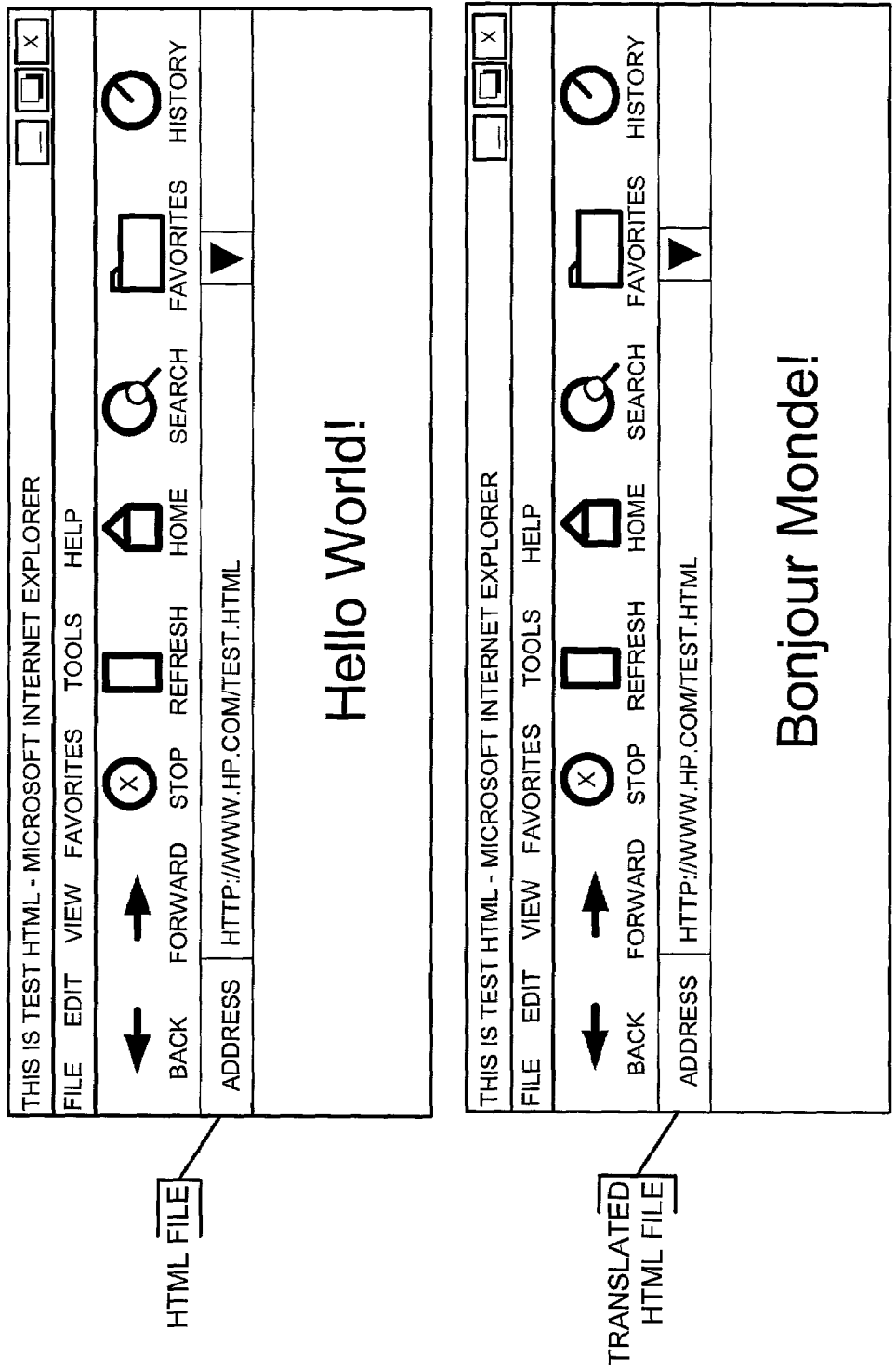

An exemplary web content in a HTML file is shown in FIG. 5, and a translated and an untranslated version of the web page for the HTML file is shown in FIG. 6. FIG. 5 illustrates a real simplified HTML file, titled "test.html" with the text, "Hello World!" Notice that the text in the original HTML file (i.e., test.html) is in the English language, and that the present invention provides a way to parse through the test.html file and translate the text into the French language, which now reads "Bonjour Monde!" Also, please notice that both web pages bear the same file name, specifically "test.html."

From the foregoing description, it should be understood that an improved system and method for providing a file in multiple languages has been shown and described, which has many desirable attributes and advantages. The system and method provides a way for a HTML file to be displayed in multiple languages. By the use of a parsing method, the present invention is able to isolate the text in the file for translations to other desired languages. Thus, multiple languages can be displayed with the use of a single HTML file. In addition, there is no specified modifications or coding required for displaying the same HTML file in other languages, and any updating of the file can be made more consistently and with less effort.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for converting text characters from a Standard Generalized Markup Language file into another specified language using a CONVERSTR variable, a HTMLCODE variable and a VAL variable, wherein each character represents a tag or text, and each tag has a start and an end, said method comprising the steps of:
  (a) reading a character from the file;
  (b) determining whether the read character is the start of a tag;
  (c) adding the read character to the CONVERTSTR variable when the read character is not the start of a tag;
  (d) repeating steps (a), (b) and (c) for a next character until a read character is the start of a tag;
  (e) converting the CONVERTSTR variable into the specified language using VAL variable; and,
  (f) adding the converted CONVERTSTR variable to the HTMLCODE variable between the determined start and end of a tag.

2. The method according to claim 1 wherein prior to step (a) further comprising the steps of:
  (g) initializing the HTMLCODE variable; and,
  (h) reading a first character from the file.

3. The method according to claim 2 wherein prior to step (g) further comprising the step of (i) downloading a Standard Generalized Markup Language file.

4. The method according to claim 1 wherein prior to step (b) further comprising the steps of:
  (j) determining whether the read character is the end of file;
  (k) initializing the CONVERTSTR variable when the read character is not the end of the file; and,
  (l) determining whether the parsing of the file is successful when the read character is the end of the file.

5. The method according to claim 1 wherein prior to step (b) further comprising the steps of:
  (r) determining whether the read character is the start of a tag;
  (s) determining whether the read character is the end of a tag when the read character is the start of a tag;
  (t) repeating from step (b) when the read character is not the start of a tag.

6. The method according to claim 5 wherein said (s) step further comprising the steps of:
  (u) adding the read character to the HTMLCODE variable when the read character is not the end of a tag;
  (v) repeating (s) and (t) for a next character until a read character is the end of a tag; and,
  (w) repeating from step (b) when the read character is the end of a tag.

7. The method according to claim 5 wherein said (s) step further comprising the steps of:
  (x) determining whether the read character is at the end of the file when the read character is not the end of a tag;
  (y) repeating from step (b) when the read character is at the end of the file;

(z) adding the read character to the HTMLCODE variable when the read character is not at the end of the file; and, (aa) repeating steps (s) and (z) for a next character until a read character is the end of a tag.

8. A method for converting text characters from a Standard Generalized Markup Language file into another specified language using a CONVERSTR variable, a HTMLCODE variable and a VAL variable, wherein each character represents a tag or text, and each tag has a start and an end, said method comprising the steps of:

(a) reading a character from the file;

(j) determining whether the read character is the end of the file;

(k) initializing the CONVERTSTR variable when the read character is not the end of the file; and, (l) determining whether the parsing of the file is successful when the read character is the end of the file (b) determining whether the read character is the start of a tag;

(c) adding the read character to the CONVERTSTR variable when the read character is not the start of a tag;

(d) repeating steps (a), (b) and (c) for a next character until a read character is the start of a tag;

(e) converting the CONVERTSTR variable into the specified language; and, (f) adding the converted CONVERTSTR variable to the HTMLCODE variable;

wherein said step (k) further comprises the steps of:

(m) returning an error message to the user when the parsing of the file is not successful;

(n) saving the translated Standard Generalized Markup Language file with the parsed code to the cache memory when the parsing of the file is successful; and, (o) displaying the translated Standard Generalized Markup Language file saved in the cache memory to the user.

9. The method according to claim 8 wherein said step (m) further comprising the step of (p) displaying the Standard Generalized Markup Language file without the translation.

10. The method according to claim 8 wherein step (b) further comprising the steps of:

(bb) determining whether the CONVERTSTR variable is empty when the read character is the start of a tag; and, (cc) repeating from step (j) when the CONVERTSTR variable is empty.

11. The method according to claim 10 wherein prior to said step (bb) further comprising the steps of:

(dd) determining whether the read character is at the end of the file;

(ee) repeating from step (e) when the read character is at the end of the file.

12. The method according to claim 8 wherein step (f) further comprising the step of (ff) repeating from step (i).

13. A system for converting text characters from a Standard Generalized Markup Language file into another specified language using a CONVERSTR variable, a HTMLCODE variable and a VAL variable, wherein, each character represents a tag or text, and each tag has a start and an end, comprising:

means for reading a character from the file;

means for determining whether the read character is the start of a tag;

means for adding the read character to the CONVERTSTR variable when the read character is not the start of a tag;

means for repeating the process for a next character until a read character is the start of a tag;

means for converting the CONVERTSTR variable into the specified language using VAL variable; and, means for adding the converted CONVERTSTR variable to the HTMLCODE variable between the determined start and end of a tag.

14. A computer program product comprising a computer usable medium having computer readable program codes embodied in the medium that when executed causes a computer to;

read a character from the file;

determine whether the read character is the start of a tag;

add the read character to the CONVERTSTR variable when the read character is not the start of a tag;

repeat the process for a next character until a read character is the start of a tag;

convert the CONVERTSTR variable into the specified language using VAL variable; and, add the converted CONVERTSTR variable to the HTMLCODE variable between the determined start and end of a tag.

* * * * *

UNITED STATES PATENT AND TRADEMARK OFFICE
CERTIFICATE OF CORRECTION

PATENT NO.        : 7,027,973 B2                                        Page 1 of 1
APPLICATION NO. : 09/905759
DATED             : April 11, 2006
INVENTOR(S)       : Lee Macklin It is certified that error appears in the above-identified patent and that said Letters Patent is hereby corrected as shown below:

In column 10, line 12, in Claim 13, delete "wherein," and insert -- wherein --, therefor.

In column 10, line 32, in Claim 14, delete "to;" and insert -- to: --, therefor.

Signed and Sealed this

Twelfth Day of May, 2009

JOHN DOLL
*Acting Director of the United States Patent and Trademark Office*